(12) United States Patent
Napier et al.

(10) Patent No.: US 11,879,416 B1
(45) Date of Patent: Jan. 23, 2024

(54) METHOD FOR REDUCING JET TAB EXPOSURE DURING THRUST VECTORING

(71) Applicant: Raytheon Company, Waltham, MA (US)

(72) Inventors: Brandon J. Napier, Tucson, AZ (US); Scott R. Wells, Tucson, AZ (US); Derek T. Betts, Tucson, AZ (US); Kevin R. Albrecht, Tucson, AZ (US)

(73) Assignee: Raytheon Company, Tewksbury, MA (US)

( * ) Notice: Subject to any disclaimer, the term of this patent is extended or adjusted under 35 U.S.C. 154(b) by 0 days.

(21) Appl. No.: 17/930,741

(22) Filed: Sep. 9, 2022

(51) Int. Cl.
*F02K 9/90* (2006.01)
*F42B 10/64* (2006.01)
*F42B 10/66* (2006.01)
*F02K 9/80* (2006.01)

(52) U.S. Cl.
CPC .................. *F02K 9/90* (2013.01); *F02K 9/80* (2013.01); *F42B 10/64* (2013.01); *F42B 10/66* (2013.01); *F42B 10/665* (2013.01)

(58) Field of Classification Search
CPC ... F41G 7/006; F02K 9/80; F02K 9/90; F42B 10/64; F42B 10/66; F42B 10/665
See application file for complete search history.

(56) References Cited

U.S. PATENT DOCUMENTS

| 3,786,993 | A | * | 1/1974 | Burgess | F02K 9/90 |
| | | | | | 239/265.19 |
| 3,986,683 | A | | 10/1976 | Ellison | |
| 4,113,203 | A | * | 9/1978 | Kocher | F41G 7/305 |
| | | | | | 244/3.11 |
| 4,274,610 | A | | 6/1981 | Bastian | |
| 5,806,791 | A | | 9/1998 | Hatalsky et al. | |
| 6,548,794 | B2 | | 4/2003 | Facciano et al. | |
| 7,313,910 | B2 | | 1/2008 | Kim et al. | |
| 8,387,360 | B2 | * | 3/2013 | Kinsey | F42B 10/665 |
| | | | | | 60/229 |
| 9,080,843 | B2 | * | 7/2015 | Mazenq | F02K 9/90 |
| 9,297,623 | B2 | * | 3/2016 | Carton | F02K 9/90 |
| 2020/0010945 | A1 | | 1/2020 | Steinwandel et al. | |
| 2022/0325993 | A1 | * | 10/2022 | Rovinsky | F41F 3/04 |

FOREIGN PATENT DOCUMENTS

BR 102012026955 A2 7/2014

* cited by examiner

*Primary Examiner* — Kyle Robert Thomas
(74) *Attorney, Agent, or Firm* — Renner, Otto, Boisselle and Sklar LLP

(57) ABSTRACT

A method of thrust vectoring a missile utilizing jet tabs is presented. Jet tabs are used to create lateral control moments on a missile by rotating tabs into the rocket exhaust plume and changing the thrust deflection angle. The method includes simultaneously rolling the missile during the thrust vector maneuver in order to reduce the maximum tab exposure to the rocket plume. The method enables aggressive pitchover maneuvers while reducing the risk of tab failure due to excessive exposure.

13 Claims, 3 Drawing Sheets

METHOD FOR REDUCING JET TAB EXPOSURE DURING THRUST VECTORING

TECHNICAL FIELD

The present disclosure relates generally to thrust vector control systems, and more particularly to a method for using a thrust vector control system with a jet tab assembly for controlling a pitchover maneuver.

BACKGROUND

A pitchover maneuver is used to point a vertically launched missile in a desired direction immediately or soon after launch. Pitchover maneuvers drive other missile performance metrics, such as minimum and maximum engagement ranges, and overall missile kinematics such as speed and maneuverability. Because the pitchover maneuver occurs immediately after launch, the missile velocity is relatively low.

The control actuation system of a missile typically utilizes aerodynamic fins to control the velocity vector of the missile during flight. However, due to the low initial velocity of the missile immediately after launch, control using the fins is not typically effective in creating moments large enough to accomplish large pitchover maneuvers. Accordingly, thrust vectoring can be used to control the missile after launch to achieve stability and maneuverability during periods of low dynamic pressure.

Various methods of creating thrust vector control exist, including movable nozzles, thrust vanes, and jet tabs. For example, a jet tab assembly is attached to the exit end of the rocket nozzle of the missile. It consists of multiple tabs that can be independently rotated into and out of the exhaust plume to divert the thrust angle as desired. When a single jet tab of the jet tab assembly is rotated into the exhaust plume, a thrust defection angle in a single plane is created. Different combinations of jet tabs rotated into the exhaust plume create different thrust deflection angles in various planes. Deflected thrust angle of the missile generates moments that can be used for lateral control of the missile.

However, there is a risk of overexposing one or more jet tabs of the jet tab assembly to the exhaust plume, which can cause a number of problems with the jet tab assembly and pitchover performance. Specifically, when one or more jet tab of the jet tab assembly is overexposed to the exhaust plume during the pitchover maneuver, the tab may experience tab ablation, resulting in a reduced effectiveness to produce the desired thrust deflection angle. Also, the jet tab assembly may experience heat damage leading to tab movement restriction due to cracked jet tab, slag between a jet tab and a scraper ring, or a warped scraper ring or shaft. Additionally, there is risk of heat damage to the motor or electronics of the jet tab assembly. Any of these effects of jet tab overexposure will limit the pitchover maneuverability and overall missile performance.

Traditional solutions to these problems include incorporating ablative materials or other exotic materials such as tungsten and composites for withstanding exposure to the exhaust plume, however these materials can be costly and impractical. Other solutions include restricting jet tab exposure by simply limiting pitchover performance.

SUMMARY

An improved method of thrust vectoring using jet tabs after launch is described herein. To reduce maximum jet tab exposure of a missile jet tab assembly to an exhaust plume of a missile after launch, the missile is controlled such that the missile is rolled simultaneously with the pitchover maneuver. Because the missile is rolling, the lateral controller must continuously utilize different combinations of tabs to achieve the desired thrust angle deflection. In this manner, the exposure of each jet tab to the exhaust plume of the missile during the thrust vector control is more evenly distributed, and the maximum individual tab exposure is reduced.

Therefore, according to an aspect of this disclosure, a method of thrust vectoring a missile includes the steps of launching the missile such that an exhaust plume exits an exit end of a rocket nozzle of the missile and changing a thrust deflection angle of the exhaust plume, thereby creating a lateral control moment on the missile. The method also includes the step of rolling the missile simultaneous to changing the thrust deflection angle of the exhaust plume.

According to an embodiment of any paragraph(s) of this disclosure, changing the thrust deflection angle of the exhaust plume includes controlling a jet tab assembly of the missile.

According to another embodiment of any paragraph(s) of this disclosure, the jet tab assembly includes a plurality of jet tabs rotatably mounted at the exit end of the rocket nozzle of the missile and the step of controlling the jet tab assembly includes rotating one or more jet tab of the plurality of jet tabs into an exhaust plume of the missile exiting the exit end of the rocket nozzle of the missile.

According to another embodiment of any paragraph(s) of this disclosure, launching the missile includes vertically launching the missile.

According to another embodiment of any paragraph(s) of this disclosure, the step of rolling the missile starts before the step of changing the thrust deflection angle of the exhaust plume.

According to another embodiment of any paragraph(s) of this disclosure, the step of rolling the missile starts after the step of changing the thrust deflection angle of the exhaust plume.

According to another embodiment of any paragraph(s) of this disclosure, the step of rolling the missile starts at a same time as the step of changing the thrust deflection angle of the exhaust plume.

According to another embodiment of any paragraph(s) of this disclosure, the step of rolling the missile includes rolling the missile at a roll rate that reduces a maximum exposure of any one of the plurality of jet tabs.

According to another aspect of this disclosure, a missile includes a thrust vector controller configured to change a thrust deflection angle of an exhaust plume exiting an exit end of a rocket nozzle of the missile after a launch of the missile. The missile also includes a roll controller configured to roll the missile simultaneously with the change of the thrust deflection angle of the exhaust plume by the thrust vector controller.

According to an embodiment of any paragraph(s) of this disclosure, the missile further includes a jet tab assembly. The thrust vector controller is configured to control the jet tab assembly to change the thrust deflection angle of the exhaust plume.

According to another embodiment of any paragraph(s) of this disclosure, the jet tab assembly is mounted at the exit end of the rocket nozzle of the missile.

According to another embodiment of any paragraph(s) of this disclosure, the jet tab assembly includes a plurality of jet tabs rotatably mounted at the exit end of the rocket nozzle of the missile, and the thrust vector controller is configured to rotate one or more jet tab of the plurality of jet tabs into the exhaust plume of the missile.

According to another embodiment of any paragraph(s) of this disclosure, the roll controller is configured to start rolling the missile before the thrust vector controller is configured to start changing the thrust deflection angle of the exhaust plume.

According to another embodiment of any paragraph(s) of this disclosure, the roll controller is configured to start rolling the missile after the thrust vector controller is configured to start changing the thrust deflection angle of the exhaust plume.

According to another embodiment of any paragraph(s) of this disclosure, the roll controller is configured to start rolling the missile at the same time as the thrust vector controller is configured to start changing the thrust deflection angle of the exhaust plume.

The following description and the annexed drawings set forth in detail certain illustrative embodiments described in this disclosure. These embodiments are indicative, however, of but a few of the various ways in which the principles of this disclosure may be employed. Other objects, advantages and novel features will become apparent from the following detailed description when considered in conjunction with the drawings.

BRIEF DESCRIPTION OF DRAWINGS

The annexed drawings show various aspects of the disclosure.

DETAILED DESCRIPTION

Figure 1:
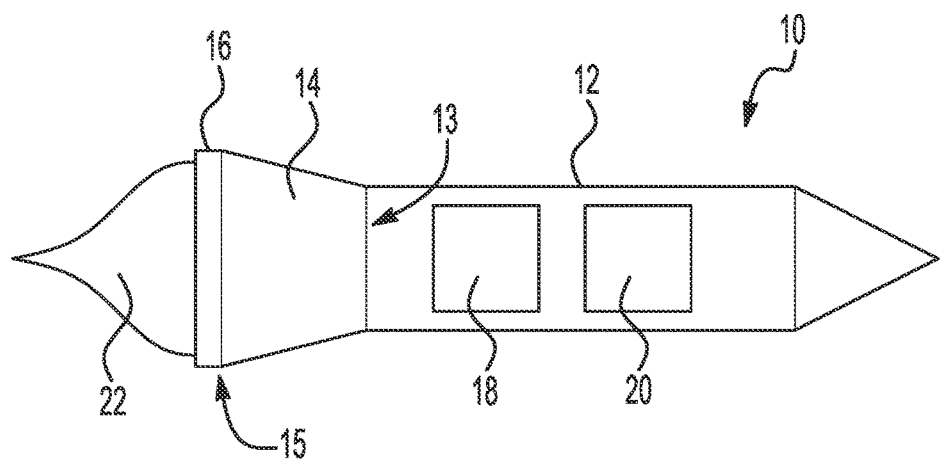
FIG. 1 is a schematic diagram of a missile.

With initial reference to FIG. 1, a missile 10 is depicted. The missile 10 includes a missile body 12 and a rocket nozzle 14 at an aft end 13 of the missile body 12. The missile 10 may additionally include a jet tab assembly 16 mounted at an exit end 15 of the rocket nozzle 14, from which an exhaust plume 22 exits to propel the missile during launch and during flight. The missile 10 includes a thrust vector controller 18 configured to change a thrust deflection angle of the exhaust plume 22 exiting the exit end 15 of the rocket nozzle 14, thereby creating a lateral control moment on the missile and changing a velocity vector of the missile 10 after a launch, as will be described in more detail below. The missile 10 also includes a roll controller 20 configured to roll the missile 10 simultaneously with the change of the thrust deflection angle of the exhaust plume 22 by the thrust vector controller 18, as will also be described in more detail below. It is understood that the missile 10 is not limited to the above-described and schematically depicted features and may additionally include other features traditionally included in missiles 10.

As used herein, the term "controller" (e.g., "the thrust vector controller 18" and "the roll controller 20") should be construed broadly to include systems with processors capable of executing instructions. Such instructions may be embodied in software and/or hardware, and/or in any of a variety of computer-readable media, memory, ROM, RAM, etc. Software includes but is not limited to, one or more computer or processor instructions that can be read, interpreted, compiled, and/or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servlet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or computer-executable instructions can be located in one logic or distributed between two or more communicating, co-operating, or parallel processing logics and thus can be loaded or executed in series, parallel, massively parallel and/or other manners.

Figure 2:
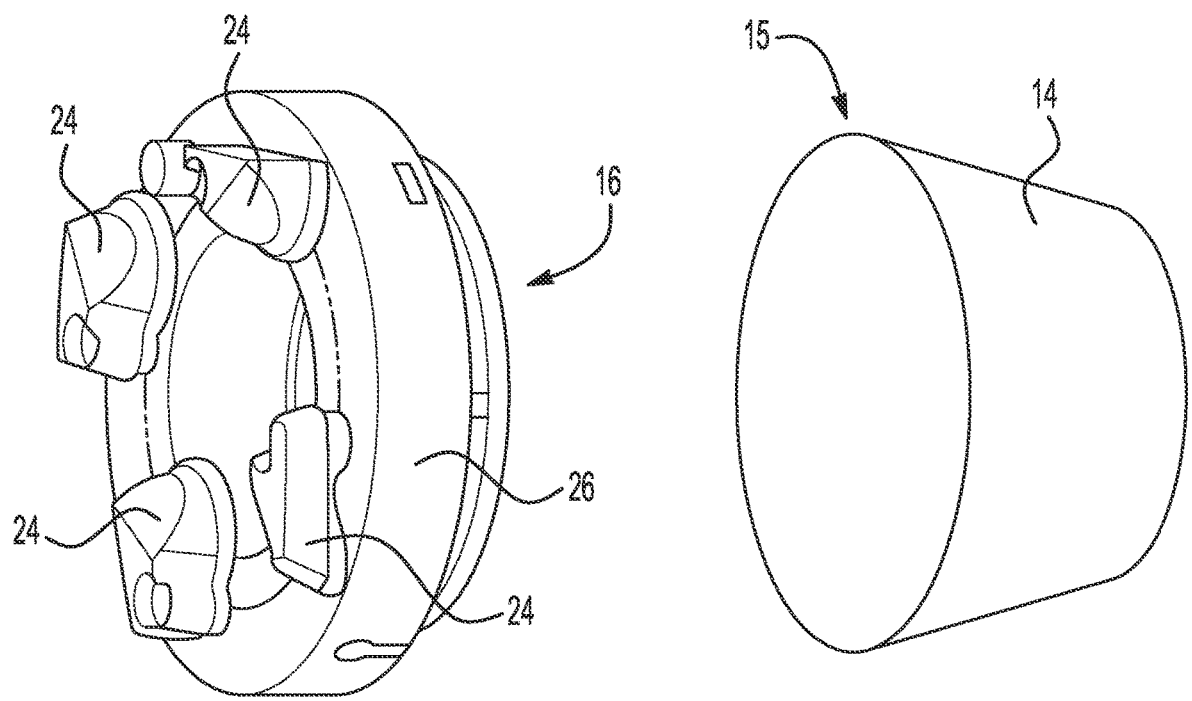
FIG. 2 is an exploded schematic diagram of a jet tab assembly on the missile of FIG. 1.
Figure 3:
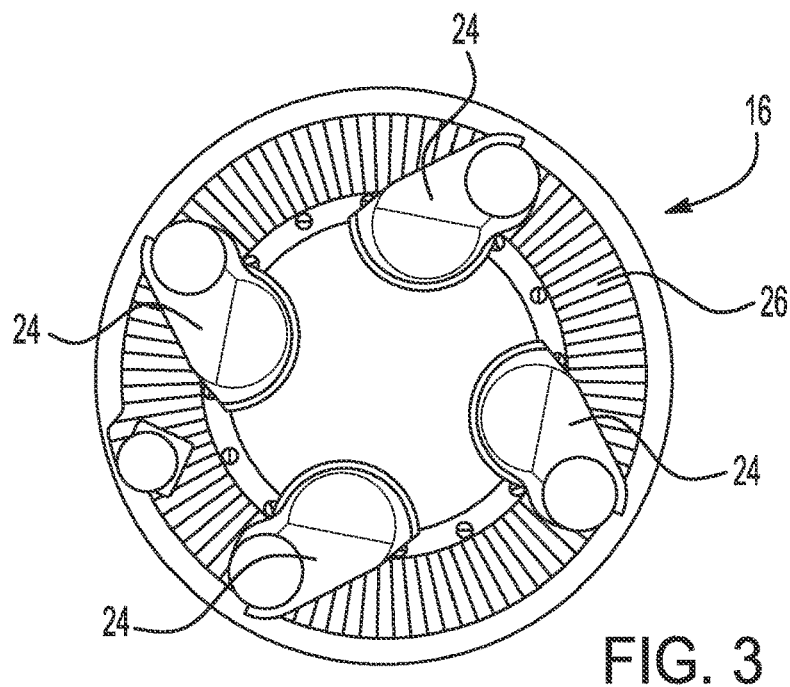
FIG. 3 is a perspective view of the jet tab assembly of FIG. 2.

The thrust vector controller 18 may be configured to change the thrust deflection angle of the exhaust plume 22 with, for example, the jet tab assembly 16. With reference to FIGS. 2 and 3, the jet tab assembly 16 may include a plurality of jet tabs 24. As depicted, for example, the jet tab assembly 16 may include four jet tabs 24. It is understood, however, that the configuration of four jet tabs 24 of the plurality of jet tabs 16 is provided as a non-limiting example and that the jet tab assembly 16 may have more than four jet tabs 24 or may have less than four jet tabs 24. Each jet tab 24 of the plurality of jet tabs 24 is rotatably mounted at the exit end 15 of the rocket nozzle 14 of the missile.

In any embodiment, the thrust vector controller 18 is configured to independently control each of the jet tabs 24 into and out of the exhaust plume to variably control the thrust deflection angle of the exhaust plume 22 and thereby create lateral control moments on the missile 10. For example, as described above with reference to jet tab assemblies used in the prior art, rotating a single jet tab 24 into the exhaust plume 22 exiting the exit end 15 of the rocket nozzle 14 may create a thrust deflection angle in a single plane. While rotating various combinations of more than one jet tab 24 into the exhaust plume 22 may create various respective thrust deflection angles in various respective planes, as desired to control the desired thrust deflection angle of the exhaust plume 22.

The roll controller 20 is configured to roll the missile 10 simultaneously with the change of the thrust deflection angle of the exhaust plume 22 by the thrust vector controller 18. For example, after launch of the missile 10, as soon as the thrust vector controller 18 begins changing the thrust deflection angle of the exhaust plume 22, the roll controller 20 is configured to start rolling the missile 10. In another embodiment, the roll controller 20 is configured to start rolling the missile 10 after the thrust vector controller 18 begins changing the thrust deflection angle. Alternatively, roll controller 20 is configured to start rolling the missile 10 before the thrust vector controller 18 begins changing the thrust deflection angle. Various roll schedules can produce various levels of benefit. For example, the roll controller 20 can command a roll rate that results in one full rotation of the missile roll orientation during the pitchover maneuver. Alternately, it could command a roll rate that results in one half a full rotation of the missile roll orientation. It is understood that the maximum benefit for reducing the maximum achieved tab exposure is application dependent and must be optimized for the particular missile and desired pitchover performance.

The thrust vector controller 18 and the roll controller 20 coordinate to maintain the thrust deflection angle of the exhaust plume during the pitchover maneuver. That is, as the missile 10 rolls, the thrust vector controller 18 controls the plurality of jet tabs 24 such that exposure of the plurality of jet tabs 24 to the exhaust plume 22 is distributed amongst the plurality of jet tabs 24 instead of only a single jet tab 24. For example, when the roll controller 20 rolls the missile 10 to a first roll position, the thrust vector controller 18 rotates a first jet tab 24 of the plurality of jet tabs 24 into the exhaust plume 22 to change the thrust deflection angle of the exhaust plume 22. As the roll controller 20 rolls the missile 10 from the first roll position to a second roll position, the thrust vector controller 18 is configured to rotate the first jet tab out of the exhaust plume 22 and rotate a second jet tab 24 adjacent the first jet tab 24 into the exhaust plume 22 such that the thrust deflection angle of the exhaust plume 22 and the thrust direction of the missile 10 is maintained as the roll controller 20 rolls the missile. In this manner, the thrust vector controller 18 is configured to change and maintain the thrust deflection angle of the exhaust plume, and the roll controller 20 is configured to roll the missile 10 such that the maximum exposure of any given jet tab 24 of the plurality of jet tabs 24 is reduced and distributed amongst the plurality of jet tabs 24 during control by the thrust vector controller 18.

Figure 4:
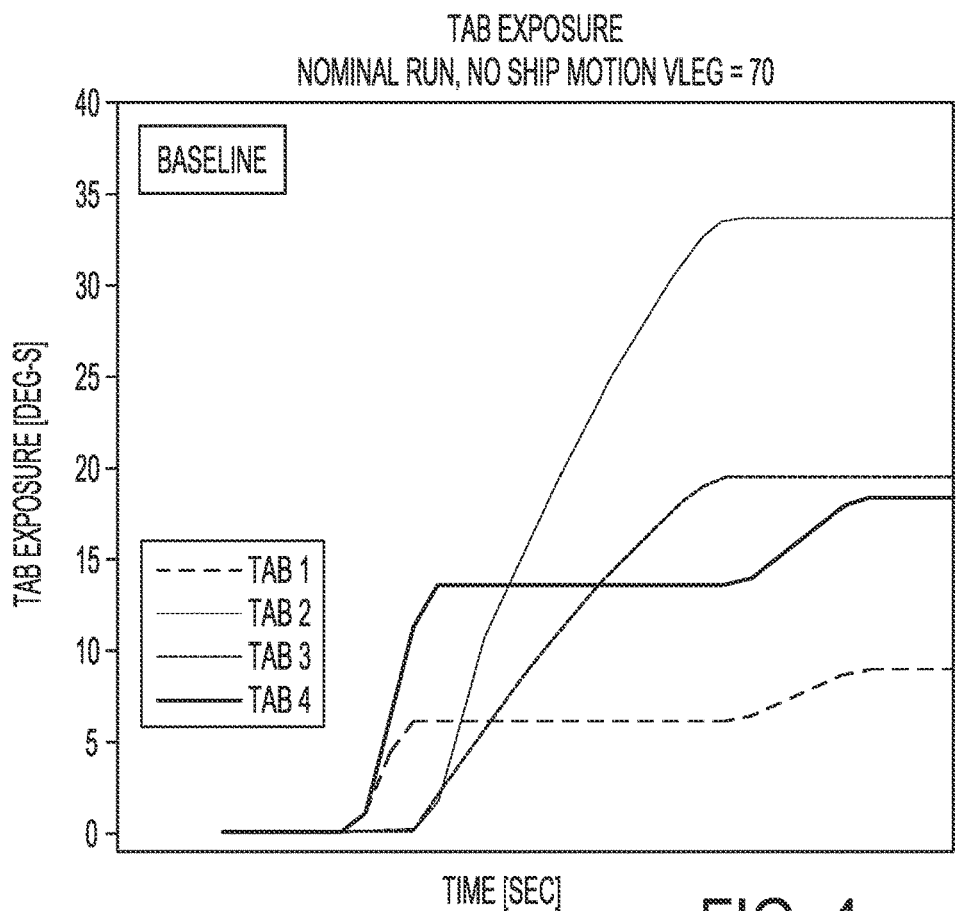
FIG. 4 is a graph showing tab exposure of four jet tabs on a jet tab assembly over time during a pitchover maneuver of the prior art.
Figure 5:
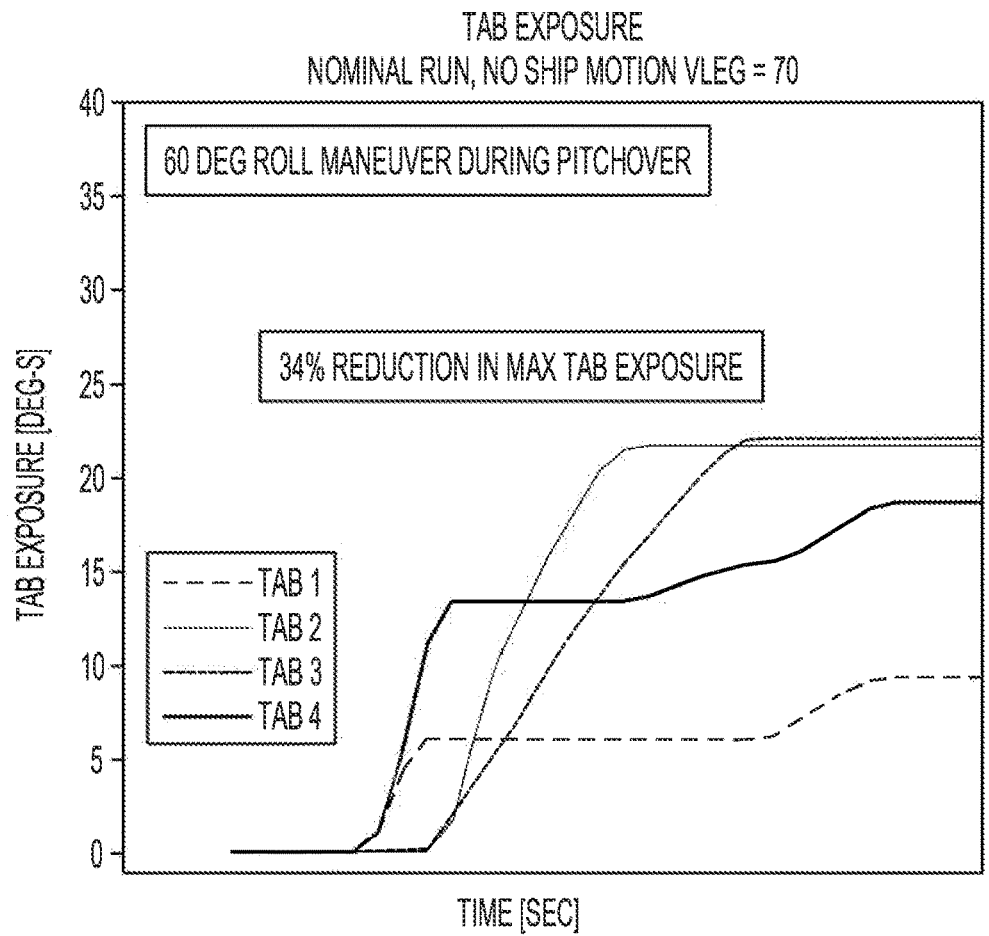
FIG. 5 is a graph showing tab exposure of four jet tabs on a jet tab assembly over time during a pitchover maneuver according to the method the disclosure.

FIG. 4 depicts a graph showing tab exposure (y-axis) on each of four jet tabs in a jet tab assembly of a missile during a pitchover maneuver of the prior art. As depicted, over time (x-axis), one of the jet tabs is subjected to a significantly higher exposure to the exhaust plume than the others. This can lead to the problems associated with overexposure of that jet tab, as described above. In contrast, FIG. 5 depicts a graph showing tab exposure (y-axis) on each of four jet tabs in a jet tab assembly, such as the jet tab assembly 16 of the missile 10 during the pitchover maneuver using the thrust vector controller 18 and roll controller 20 described herein. As depicted, over time (x-axis) during the pitchover maneuver, the exposure of the jet tabs 24 to the exhaust plume 22 is distributed more evenly over each the four jet tabs 24. In the depicted graph, for example, a 34% reduction in maximum tab exposure is achieved by a 60 degree roll during the pitchover maneuver. This reduction may keep the maximum exposure below a specified limit, thus enabling desired pitchover performance without risk of jet tab assembly failure.

Figure 6:
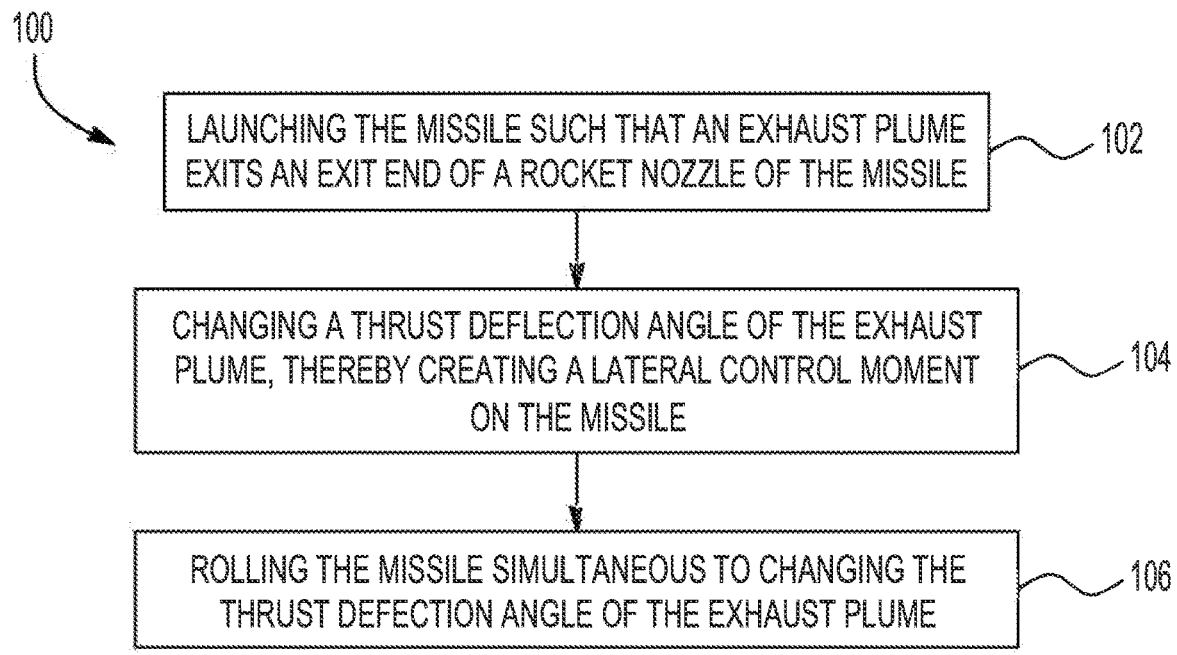
FIG. 6 is a flowchart of a method of thrust vectoring a missile.

FIG. 6 depicts a flowchart of a method 100 of thrust vectoring a missile, such as the missile 10 described above. The method 100 includes a step 102 of launching the missile such that an exhaust plume exits an exit end of a rocket nozzle of the missile. The step 102 of launching the missile may include, for example, vertically launching the missile, such that thrust vectoring is required to change the velocity vector of the missile.

The method 100 then includes a step 104 of changing a thrust deflection angle of the exhaust plume, thereby creating a lateral control moment that changes the velocity vector of the missile. The step 104 of changing the thrust deflection angle of the exhaust plume may include controlling a jet tab assembly, such as the jet tab assembly 16 described above, of the missile. The jet tab assembly may include a plurality of jet tabs rotatably mounted at the exit end of the rocket nozzle of the missile. The step of controlling the jet tab assembly may therefore include rotating one or more jet tab of the plurality of jet tabs into an exhaust plume of the missile exiting the exit end of the rocket nozzle of the missile.

The method 100 then includes a step 106 of, simultaneously with the step 104 of changing the thrust deflection angle of the exhaust plume, rolling the missile. By simultaneously changing the thrust deflection angle of the exhaust plume with the jet tab assembly and rolling the missile, the exposure of any one jet tab of the plurality of jet tabs may be distributed among all of the plurality of jet tabs, such that none of the plurality of jet tabs reach their maximum exposure limits and cause the problems associated with such, as described above. A maximum exposure of the exhaust plume on any one of the one or more jet tab may therefore be reduced.

Although the above disclosure has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments. In addition, while a particular feature may have been described above with respect to only one or more of several illustrated embodiments, such feature may be combined with one or more other features of the other embodiments, as may be desired and advantageous for any given or particular application.

What is claimed is:

1. A method of thrust vectoring a missile, comprising the steps of:
   launching the missile such that an exhaust plume exits an exit end of a rocket nozzle of the missile;
   changing a thrust deflection angle of the exhaust plume by controlling a jet tab assembly of the missile, thereby creating a lateral control moment on the missile; and
   as a result of changing the thrust deflection angle of the exhaust plume and simultaneously with changing the thrust deflection angle of the exhaust plume, rolling the missile, wherein a roll amount of the missile is a function of the lateral control moment on the missile and a reduction of maximum exposure of any one of a plurality of jet tabs in the jet tab assembly.

2. The method according to claim 1, wherein the jet tab assembly includes the plurality of jet tabs rotatably mounted at the exit end of the rocket nozzle of the missile and the step of controlling the jet tab assembly includes rotating one or more jet tab of the plurality of jet tabs into an exhaust plume of the missile exiting the exit end of the rocket nozzle of the missile.

3. The method according to claim 1, wherein launching the missile includes vertically launching the missile.

4. The method according to claim 1, wherein the step of rolling the missile starts before the step of changing the thrust deflection angle of the exhaust plume.

5. The method according to claim 1, wherein the step of rolling the missile starts after the step of changing the thrust deflection angle of the exhaust plume.

6. The method according to claim 1, wherein the step of rolling the missile starts at a same time as the step of changing the thrust deflection angle of the exhaust plume.

7. The method according to claim 2, wherein the step of rolling the missile includes rolling the missile at a roll rate that reduces the maximum exposure of any one of the plurality of jet tabs.

8. A missile, comprising:
a jet assembly;
a thrust vector controller configured to change a thrust deflection angle of an exhaust plume exiting an exit end of a rocket nozzle of the missile after a launch of the missile, thereby creating a lateral control moment on the missile, wherein the thrust vector controller is configured to control the jet tab assembly to change the thrust deflection angle of the exhaust plume; and
a roll controller configured to roll the missile simultaneously with the change of the thrust deflection angle of the exhaust plume by the thrust vector controller, wherein the roll controller is configured to roll the missile a roll amount that is a function of the lateral control moment on the missile and a reduction of maximum exposure of any one of a plurality of jet tabs in the jet tab assembly.

9. The missile according to claim 8, wherein the jet tab assembly is mounted at the exit end of the rocket nozzle of the missile.

10. The missile according to claim 8, wherein the jet tab assembly includes a plurality of jet tabs rotatably mounted at the exit end of the rocket nozzle of the missile, and the thrust vector controller is configured to rotate one or more jet tab of the plurality of jet tabs into the exhaust plume of the missile.

11. The missile according to claim 8, wherein the roll controller is configured to start rolling the missile before the thrust vector controller is configured to start changing the thrust deflection angle of the exhaust plume.

12. The missile according to claim 8, wherein the roll controller is configured to start rolling the missile after the thrust vector controller is configured to start changing the thrust deflection angle of the exhaust plume.

13. The missile according to claim 8, wherein the roll controller is configured to start rolling the missile at the same time as the thrust vector controller is configured to start changing the thrust deflection angle of the exhaust plume.

* * * * *

UNITED STATES PATENT AND TRADEMARK OFFICE
CERTIFICATE OF CORRECTION

| | | |
|---|---|---|
| PATENT NO. | : 11,879,416 B1 | Page 1 of 1 |
| APPLICATION NO. | : 17/930741 | |
| DATED | : January 23, 2024 | |
| INVENTOR(S) | : Napier et al. | |

It is certified that error appears in the above-identified patent and that said Letters Patent is hereby corrected as shown below:

In the Specification

In Column 4, Line 36, delete "16" and insert --24-- therefor

Signed and Sealed this
Tenth Day of December, 2024

Katherine Kelly Vidal
*Director of the United States Patent and Trademark Office*